Dec. 19, 1967 J. G. SNYDER 3,358,454
SEQUENTIALLY OPERATED BIDIRECTIONAL ROCKET
MOTORS FOR THRUST DIRECTION MODIFICATION
Filed Oct. 22, 1965 2 Sheets-Sheet 1
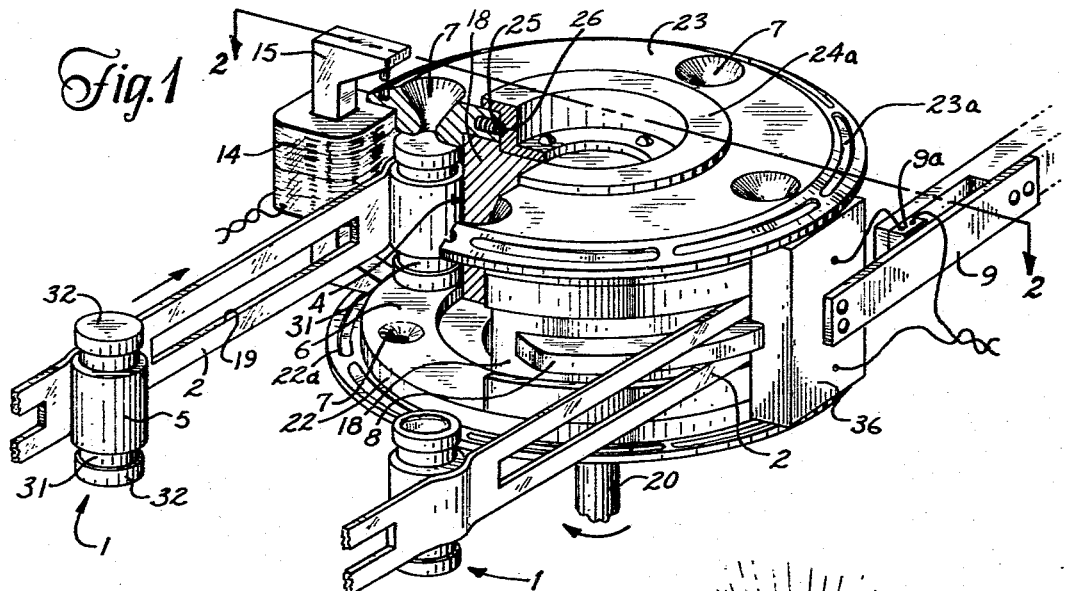
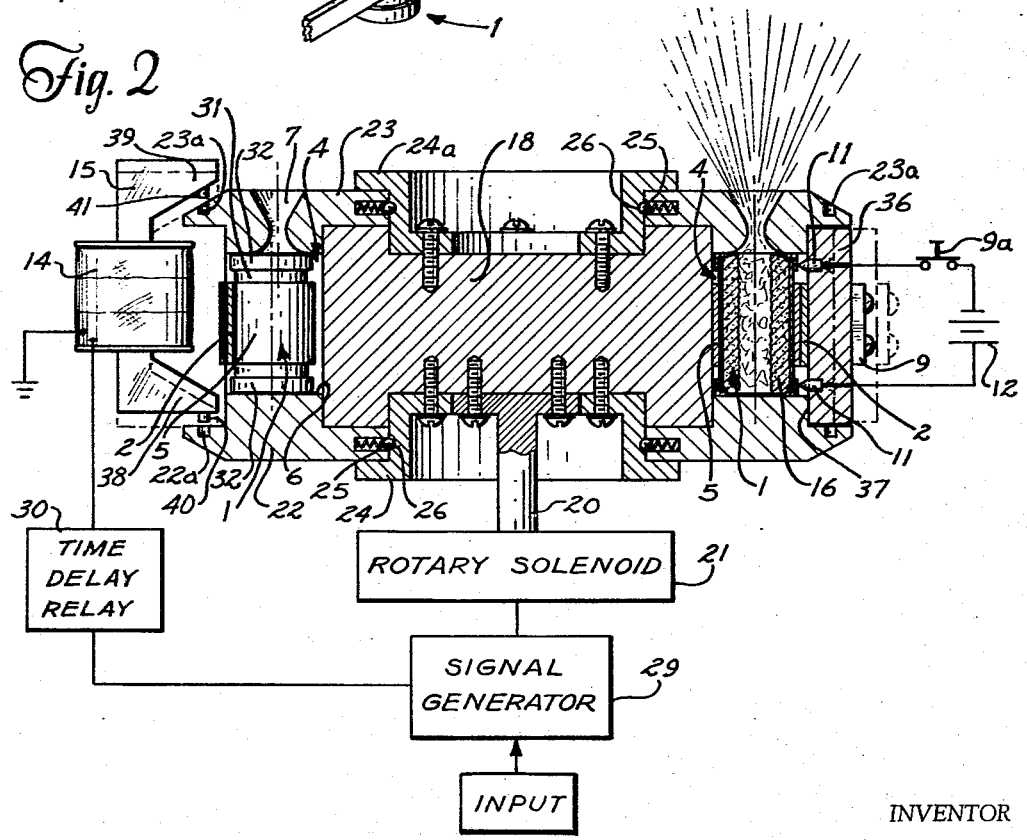
INVENTOR
JOHN G. SNYDER
BY *Lawrence R. Hyter*
ATTORNEY Dec. 19, 1967  J. G. SNYDER  3,358,454
SEQUENTIALLY OPERATED BIDIRECTIONAL ROCKET
MOTORS FOR THRUST DIRECTION MODIFICATION
Filed Oct. 22, 1965  2 Sheets-Sheet 2

INVENTOR

JOHN G. SNYDER

BY Laurence R. Hepter

ATTORNEY

United States Patent Office 3,358,454
Patented Dec. 19, 1967

3,358,454
SEQUENTIALLY OPERATED BIDIRECTIONAL ROCKET MOTORS FOR THRUST DIRECTION MODIFICATION
John G. Snyder, Fairfax County, Va., assignor to Atlantic Research Corporation, Fairfax, Va., a corporation of Virginia
Filed Oct. 22, 1965, Ser. No. 501,698
8 Claims. (Cl. 60—229)

ABSTRACT OF THE DISCLOSURE

A bidirectional rocket motor system comprising a plurality of cartridges individually mounted on a feed tape or other support means, each of said cartridges having an internal burning solid propellant grain for discharging combustion products at either end of the cartridge. The cartridges are advanced on the tape to a positioning and firing mechanism wherein each cartridge is moved to an ignition position between a pair of opposing backing plate and nozzle assemblies disposed adjacent opposite ends of the cartridge. The opposing assemblies are so mutually positioned that the nozzles of one assembly are in alignment with the backing plates of the other assembly, thereby enabling each cartridge to provide thrust in a desired direction when it is in the ignition position by selectively moving the backing plate and nozzle assemblies.

---

Figure 3:
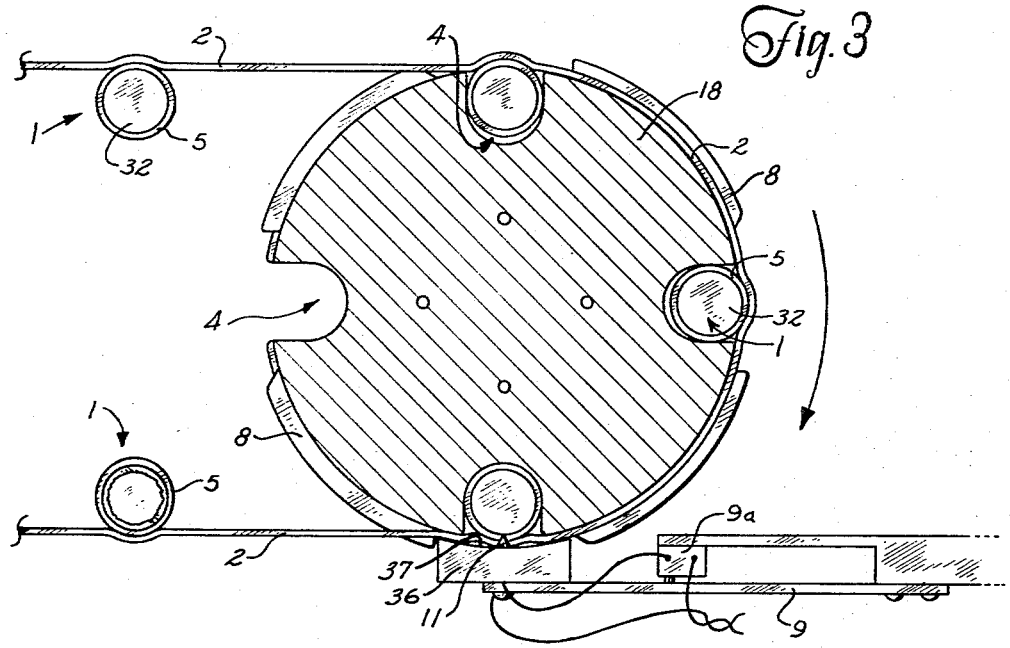

This invention relates to an intermittently operated gas generator and, in particular, to a solid propellant rocket motor capable of intermittent, bidirectional operation.

Attitude or space vectoring of space vehicles by means of a series of tape encapsulated propellant charges which are individually admitted into a combustion chamber and ignited to produce a pulsating unidirectional thrust is known. The present invention is directed to a solid-propellant-fueled gas generator which can be operated to provide, on command, a pulsating thrust either in a forward-acting or in a rearward-acting direction as desired, i.e., bidirectionally.

This invention provides a pulse rocket motor system having, in combination, a series of individual propellant grain cartridges with shiftable nozzle and cartridge backing plate means provided at each of the ends of the cartridges, whereby the cartridges are made operable in either a forward or rearward direction.

A major advantage of the invention is that one pulse rocket motor system is able to do the work of two, thereby halving the total number of systems which normally would be required to control the roll, pitch and yaw of a space craft. A further advantage of the invention is that it permits use of a light-weight propellant cartridge which is free of a nozzle and a reinforced end. These advantages result in a considerable reduction in weight of the total system which must be lofted and a substantial increase of the impulse-to-weight ratio. The advantages increase especially when the number of cartridges carried by the system is high, e.g., in the hundreds or thousands.

Further objects and advantages will be seen by reading the following specification in conjunction with the drawings, in which like parts in the several figures are identified by the same reference character.

Figure 4:
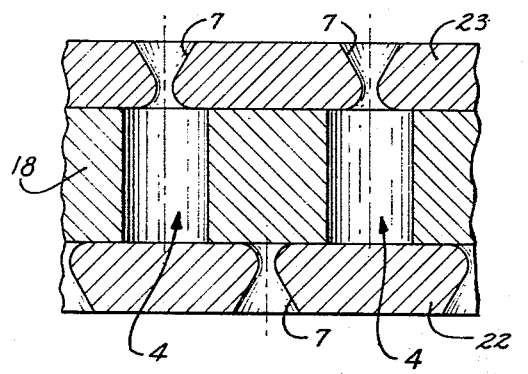
Figure 5:
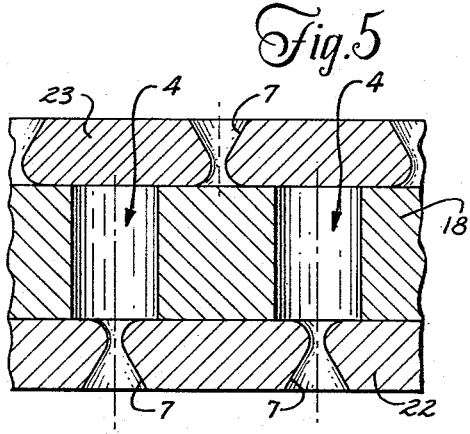
Figure 6:
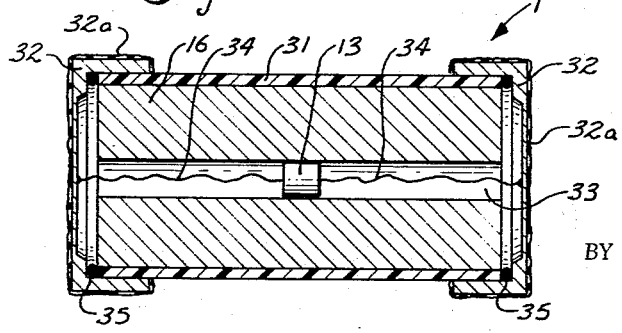

FIGURE 1 is a perspective view having a partial section taken therethrough of one embodiment of this invention, FIGURE 2 is a partial section of the rocket motor of FIGURE 1 taken along a plane passing through line 2—2 in the direction indicated by the arrows, including an embodiment of the control and ignition systems in schematic form, FIGURE 3 is a schematic plan view of a series of cartridges being transported by the cartridge-holding means of this invention, FIGURE 4 is a longitudinal cross section of a series of nozzles and backing plates, and of the cartridge-holding means in alignment for discharging propulsion gases in an upward direction, FIGURE 5 is a view similar to FIGURE 4 in which the elements are in alignment for discharging propulsion gases in a downward direction, and FIGURE 6 is a sectional view of a cartridge employed in this invention.

Broadly speaking, one embodiment of this invention comprises a rocket motor system designed to provide thrust in either a forward or rearward direction by using individual cartridges mounted on a continuous belt or tape. The cartridges are serially positioned in a cartridge-receiving and supporting means between a pair of nozzle rings having a plurality of nozzles and backing plates or walls in alternating relationship. The rings are operated such that the nozzles of one ring are aligned with the backing plates or walls of the other ring, thus providing only one nozzle through which the propulsion gases 14 can exit.

This system employs a series of cartridges having internal-burning solid propellant grains capable of discharging combustion products at either end of the cartridge. The cartridges are individually mounted on a continuous tape and are advanced from a storage magazine or chamber in a manner that serially positions and axially aligns the cartridges between the nozzle rings and, more specifically, between a rocket nozzle in one ring and a backing plate in the other ring. When thrust is needed, the cartridge is ignited and the combustion products are expelled through the exhaust nozzle. The thrust produced by the serially ignited grains is pulsating in its effect and the motor can be operated for one or more pulses, depending upon the total impulse demands. When it is desired to reverse the thrust direction, the nozzle rings are rotated such that a nozzle is located at the appropriate end of the cartridge and a backing plate is located at the other end of the cartridge. Control means are provided to effect the desired direction of thrust upon command from a signal source which can be manually or automatically controlled and which can be located remote from the rocket motor.

The invention can be practiced by an embodiment as shown in the drawings, particularly, FIGURES 1 and 2. A plurality of cartridges 1 are mounted on a flexible belt 2 by being firmly contained in loops 5 affixed to the belt 2. The belt 2 can be made of any suitable material such as woven glass fiber and the loops 5 can be sewed or otherwise suitably fastened to the belt 2. The cartridges are spaced apart to correspond to the cartridge-receiving means 4 described below. The belt of cartridges 1 can be stored in a magazine (not shown) in serpentine or overlapping manner or, instead, can be wound on a storage drum (not shown).

As may be seen in FIGURE 6, the cartridge 1 comprises a hollow cylindrical casing 31 closed and sealed at each end by a rupturable metal cap 32. The casing 31 is made of a nonconductive material, sufficiently strong and heat-resistant to permit exposure to high pressures and temperatures during the period of use of the rocket motor. An example of such a material is phenol-formaldehyde, resin-impregnated glass fibers. Mounted inside the casing 31 is an internal-burning perforated solid propellant grain 16. The grain 16 can be of any suitable gas-generating composition known in the propellant or pyrotechnic arts, e.g., double-base propellant comprising nitrocellulose plasticized with nitroglycerine, a composite propellant such as a composition comprising a synthetic resin, e.g., polyvinyl chloride, and a perchlorate, e.g., ammonium perchlorate, or a metal-oxidant mixture, e.g., boron and potassium nitrate bound with a plastic resin binder. Inside the grain perforation 33 is located an initiator charge 13 made to ignite by passage of an electric current through lead wires 34 which are fastened, such as by soldering, to the rupturable metal caps 32 on the ends of the casing 31. The metal caps extend completely across the ends of the casing 31 and partially longitudinally down along the sides of the casing 31 as may be seen in FIGURE 6. This can be accomplished by forming the caps 32 with an internal diameter equal to the external diameter of the casing 31 or, by reducing the outside diameter of the casing in the area immediately adjacent the ends thereof to permit the cap 32 to slip over the end and have an outside diameter equal to the outside diameter of the casing, thereby forming an outer envelope of uniform diameter. A resilient sealing gasket 35, such as an O-ring, is placed inside each cap to provide an effective gas seal at each end of the casing. The metal caps 32 are coated with a protective insulating coating 32a in order to prevent accidental ignition of the cartridge 1. The coating material must be such that it can be readily penetrated by a sharp rigid member as described below. Any conventional nonconductive lacquer will sufficiently insulate the cap 32.

Adverting now to FIGURES 1, 2, and 3, there is detailedly shown the mechanism for positioning and firing the cartridge 1. In order to receive and move the cartridge 1 into firing position, there is provided a transport means or stepper drive wheel 18 having a plurality of recesses 4 provided in the peripheral surface thereof, the recesses 4 being shaped to receive the cartridges 1. Four such recesses are shown in FIGURE 3, however, it should be noted that the number of recesses is a matter of design and can be varied to fit the need in terms of rapidity of firing, system size, etc. The stepper drive wheel 18 is rotated by a conventional rotary control solenoid 21 through means of a shaft 20 affixedly attached to the stepper wheel 18. The rotary solenoid 21 rotates the drive wheel 18 through a predetermined angular distance on receipt of a signal from a signal generator 29.

Affixedly attached to the upper and lower surfaces of the drive wheel 18 by any conventional means, such as bolts, is a pair of support plates 24, 24a which are shaped to provide an annular recess between each support plate 24, 24a and the drive wheel 18. Annular nozzle rings 22, 23 are received in the recesses provided between the drive wheel 18 and the support plates 24, 24a, respectively. The nozzle rings are keyed to their respective support plates by means of a spring-loaded ball detent clutch 25 attached to the nozzle rings 22, 23 and which are releasably received by depressions 26 provided in the outer periphery of the support plates 24, 24a. There are twice as many depressions 26 as there are recesses 4, and the depressions are positioned such that one half of them correspond to the location of the recesses 4 and the other half are spaced midway between the recesses 4.

The nozzle rings 22, 23 are identical and include a plurality of converging-diverging or De Laval nozzles 7 spaced about the ring, the number of nozzles corresponding to the number of recesses 4 in the drive wheel 18. The area 6 between the nozzles 7 is a solid flat surface forming a backing plate against which one end of the cartridge rests. The nozzle rings 22, 23 are oriented to be out of phase with one another, i.e., the nozzle 7 of one ring is aligned with the backing plate area 6 of the other ring. The cartridges 1 are fed into the recess 4 between the nozzle rings 22, 23 and the nozzle rings and drive wheel 18 together with a closure plate 36 form a chamber for affixedly holding the cartridge 1 in place during firing. As may be seen in FIGURE 3, the inner surface 37 of the closure plate 36 is curved to fit the circumference of drive wheel 18 and form a chamber therewith. The closure plate 36 is provided with a pair of contact points 11 on the interior surface thereof and sufficiently spaced apart so as to contact the metal caps 32 on the ends of the cartridge 1 when the cartridge is in firing or ignition position. The closure plate 36 is given an oscillating movement by means of lift cams 8 located on the periphery of the drive wheel 18 between the recesses 4, as may be seen in FIGURES 1 and 3. In order to permit the cam 8 to contact the closure plate 36, an opening 19 is provided through the belt 2 between the loops 5 through which the cams 8 extend outwardly. As the drive wheel 18 rotates to position the cartridge 1 between the drive wheel and the closure plate 36, lift cam 8 contacts the inner surface 37 of the closure plate 36 and causes the closure plate to move away from the drive wheel 18 until the cartridge is in the ignition position. The closure plate is spring-loaded by a beam spring 9 which is supported by the frame of a support structure or housing (not shown) on which the drive wheel 18 is mounted. The cam 8 is designed such that when the cartridge 1 reaches the ignition position, the beam spring 9 causes the closure plate to rapidly move or snap toward the stepper wheel 18 forming a closed chamber and causing the contacts 11 to pierce the coating 32a on the metal caps 32, thus completing a circuit through the initiator charge 13. The contact points 11 are supported in electrically insulated passages in the closure plate 36 and are connected to a source of electrical energy, such as a battery 12. If desired, an on-off switch 9a can be provided or the switching means for controlling the current flow through the initiator charge 13 can be controlled by a circuit energized by the signal generator or rotary solenoid. Since the contacts form a closed circuit only when in contact with the cartridge 1 the switch 9a can be normally closed, since as long as the contact points 11 are not in contact with the caps 32 on the cartridge 1, the circuit including the energy source 12 is open. This will permit rapid firing of a plurality of cartridges without the need for opening and closing a switch.

As can be seen in FIGURE 2, when the cartridge 1 is in ignition position, one end of the cartridge abuts against the backing plate 6 of one of the nozzle rings, in the illustration ring 22, while the other end of the cartridge is aligned with the nozzle 7 of the nozzle ring 23. Therefore, upon ignition of the initiator charge and the commencement of burning of the propellant 16, the high pressure formed by the combustion products causes the metal cap 32 adjacent the nozzle 7 to rupture thus providing an exit for the combustion products resulting in the generation of thrust. The high pressure combustion products also cause the cartridge casing 31 to expand sufficiently to seal the ends of the cartridge 1 against the nozzle rings 22, 23, drive wheel 18, and closure plate 36 to ensure adequate sealing. Upon receiving a signal from the signal generator 29 of a new demand for thrust, the rotary solenoid rotates the drive wheel 18 through a predetermined angular distance. The drive wheel, in turn, causes the cartridge 1 to move with it and positions the next successive cartridge in place. Attached to the drive wheel 18 are the support plates 24, 24a, which, in turn, cause the nozzle rings 22, 23 to rotate through the same predetermined distance with the cartridges. Because the nozzles 7 are spaced apart corresponding to the spacing of the recesses 4 and, consequently, to the cartridges 1, within the recesses, the next cartridge brought into ignition position will have a nozzle 7 at the same end as the previous cartridge resulting in the production of thrust in the same direction.

When it is desired to reverse the direction of thrust it is necessary to cause the nozzle rings 22, 23 to rotate only one half a step such that the backing plates 6 of the nozzle ring 23 will be adjacent the end of the cartridge 1 whereas the nozzle 7 of the nozzle ring 22 will be adjacent to the end of the cartridge 1. This is accomplished by means of a pawl mechanism 15 comprising a solenoid coil 14 positioned about the central shaft portion of the pawl 15. The pawl 15 is provided on each end with webs 38, 39 which overlay peripheral portions of the nozzle rings 22, 23, respectively. These portions of the nozzle rings 22, 23 are provided with grooves 22a, 23a, which are aligned with projections 40, 41 extending downwardly from the webs 38, 39, respectively. The grooves 22a, 23a, have an arcuate length of one half the distance of angular rotation of the drive wheel 18.

When it is desired to reverse the direction of thrust the solenoid coil 14 is actuated effecting downward movement of the pawl 15 causing the projections 40, 41 to be received by the grooves 22a, 23a, respectively. As the drive wheel 18, the support plates 24, 24a, and the nozzle rings 22, 23 rotate, the projections 40, 41 will ride within the grooves 22a, 23a until the end of the groove is reached. At this point, the projections abut against the wall at the end of the grooves preventing further rotation of the nozzle rings 22, 23. Continued rotation of the drive wheel 18 and support plates 24, 24a causes disengagement of the nozzle rings 22, 23 from the support plates 24, 24a by forcing the spring-loaded ball detent 25 to retract from the depression 26. The drive wheel 18 and the cartridges 1 continue to rotate until the complete predetermined angular length of rotation is completed at which time the next set of depressions 26 are aligned with the detents 25 permitting re-engagement of the nozzle rings 22, 23 with the support plates 24, 24a. At this point the pawl solenoid 14 is de-energized causing the pawl 15 to rise out of contact with the nozzle rings 22, 23. This operation effects a phase shift of the nozzle rings 22, 23 such that the nozzle 7 in the lower nozzle ring 22 is now aligned with the cartridge 1. FIGURES 4 and 5 illustrate a relative alignment of the nozzle rings 22, 23 with the recesses 4 for opposite thrust directions.

A time delay 30 is provided in the circuit to permit the nozzle rings 22, 23 to rotate a little before energization of the solenoid 14 thus ensuring that the projections 40, 41 are received by the next successive groove and to avoid the projections from abutting the end wall of the preceding groove which would prevent all rotation of the nozzle rings 22, 23. While such time delay 30 is shown, it is suggested that by proper design of the pawl solenoid 14, the delay can be built into the energizing system and, therefore, the need for the time delay relay can be obviated.

While the preferred embodiment shown in the drawings and described above employs a plurality of nozzles and backing plates, it is clear that a modification thereof can include only a single nozzle and backing plate on each end of the drive wheel.

It can be seen that this invention provides a rocket motor system capable of intermittent bidirectional operation. The ignition circuit can be connected such that the motors are fired successively with the only hesitation the time required to cause the next successive cartridge to move into the ignition position. Alternatively, the ignition circuit can be controlled such that each cartridge is fired upon separate command. The ignition can be operated manually or automatically and can be controlled by command signals within the vehicle on which the motor is used or from a remote point such as by means of a radio link. The system provides a reliable, relatively inexpensive, light-weight control rocket having a high impulse-to-weight ratio and capable of bidirectional operation.

While a specific embodiment has been shown an described above, it will be obvious to those skilled in the art that various changes and modifications may be made without departing from the invention in its broader aspects. Therefor, it is intended in the appended claims to cover all such changes and modifications as fall within the true spirit and scope of this invention.

What is claimed is:
1. A multidirectional pulse rocket motor system comprising
(a) a plurality of gas generating cartridges, each of said cartridges including
  (i) a casing having a plurality of openings facing in different directions,
  (ii) a solid propellant grain mounted within said casing,
  (iii) ignition means to initiate burning of said grain, and
  (iv) a cap sealingly mounted at each opening of said casing forming, together with said casing, an enclosure for said grain,
(b) a support means having said cartridges mounted thereon in series, spaced-apart relationship,
(c) transport means to move said cartridges sequentially into an ignition position, said transport means having a plurality of cartridge-receiving means spaced peripherally thereabout, the spacing of said receiving means corresponding to the spacing of said cartridges on said support means,
(d) drive means to move said transport means through a predetermined distance upon receipt of a demand signal,
(e) a plurality of thrust direction control means oriented in different directions relative to each other, each of said thrust direction control means comprising
  (i) an exhaust nozzle extending longitudinally therethrough, and
  (ii) a backing plate shaped to abut firmly against said caps,
the nozzle of one of said thrust direction control means being longitudinally aligned with one of the caps on a cartridge in said ignition position and the backing plate of the other thrust direction control means being aligned with the other caps,
(f) actuating means operatively associated with said thrust direction control means to effect relative motion between said transport means and said thrust direction control means upon receipt by said actuating means of a signal indicating a change in thrust direction is desired, said relative motion causing longitudinal alingment of the nozzle of one of said other thrust direction control means and the backing plate of said one of said thrust direction control means with the caps of one of said cartridges, and
(g) means to energize said ignition means of the cartridge which is in said ignition position to initiate burning of said grain to produce gaseous combustion products, said products effecting rupture of the cap adjacent to the nozzle which is aligned with said cartridge, said products then exhausting through the nozzle.

2. A bidirectional pulse rocket motor system comprising
(a) a plurality of solid propellant gas generating cartridges serially mounted on a cartridge-holding means,
(b) transport means to move said cartridges sequentially into an ignition position,
(c) thrust direction control means drivingly connected to said transport means, said control means comprising a first backing plate and exhaust nozzle assembly adapted to be disposed adjacent one end of each cartridge when it is in said ignition position and a second backing plate and exhaust nozzle assembly adapted to be disposed adjacent the other end of each cartridge when it is in said ignition position, said first and second assemblies being aligned out of phase with respect to each other such that the nozzle of one of said assemblies is in alignment with the backing plate of the other of said assemblies, said assemblies being selectively movable to align the nozzle of one assembly and the backing plate of the other assembly with the ends of each cartridge when it is in said ignition position, thereby enabling each cartridge to provide thrust in a desired direction when it is in said ignition position, and (d) ignition means for initiating burning of each of said cartridges when it is in said ignition position and when said thrust direction control means is oriented to provide the desired thrust direction.

3. A bidirectional pulse rocket motor system comprising
   (a) a plurality of gas generating cartridges, each of said cartridges including
      (i) a casing open at opposite ends thereof,
      (ii) a solid propellant grain mounted within said casing,
      (iii) ignition means to initiate burning of said grain, and
      (iv) a cap sealingly mounted at each end of said casing forming, together with said casing, an enclosure for said grain,
   (b) a flexible belt having said cartridges mounted thereon in series, spaced-apart relationship,
   (c) transport means to move said cartridges sequentially into an ignition position, said transport means having a plurality of cartridge-receiving means spaced peripherally thereabout, the spacing of said receiving means corresponding to the spacing of said cartridges on said belt,
   (d) drive means to move said transport means through a predetermined distance upon receipt of a demand signal,
   (e) first and second thrust direction control means releasably affixed to said transport means to selectively permit
      (i) combined movement of said thrust direction control means with said transport means, or
      (ii) relative movement between said thrust direction control means and said transport means,
   said first and second thrust direction control means each comprising
      (i) an exhaust nozzle extending longitudinally therethrough, and
      (ii) a backing plate shaped to abut firmly against said caps,
   said first and second thrust direction control means being aligned out of phase with respect to each other such that the nozzle of said first thrust direction control means is longitudinally aligned with the backing plate of said second thrust direction control means, the nozzle of said first thrust direction control means and the backing plate of said second thrust direction control means being longitudinally aligned with one of said cartridges and the corresponding cartridge-receiving means when said one of said cartridges is in said ignition position to provide thrust in a first direction,
   (f) clutch means operatively associated with said first and second thrust direction control means to effect relative motion between said transport means and said thrust direction control means upon receipt by said clutch means of a signal indicating a reversal in thrust direction is desired, said relative motion causing longitudinal alignment of the nozzle of said second thrust direction control means and the backing plate of said first thrust direction control means with one of said cartridges and the corresponding cartridge-receiving means, and
   (g) means to energize said ignition means of the cartridge which is in said ignition position to initiate burning of said grain to produce gaseous combustion products, said products effecting rupture of one of said caps on the end of the cartridge adjacent to the nozzle which is aligned with said cartridge, said products then exhausting through the nozzle.

4. A bidirectional pulse rocket motor system as defined in claim 3 wherein said clutch means, upon receipt of a signal indicating a reversal in thrust direction is desired, permits rotation of said first and second thrust direction control means with said transport means for a portion of said predetermined angular distance and prevents rotation of said first and second thrust direction control means through the remaining angular distance through which said transport means rotates.

5. A bidirectional pulse rocket motor system as defined in claim 3 wherein the source of said demand signal is located remote from said pulse rocket motor system.

6. A bidirectional pulse rocket motor system comprising
   (a) a plurality of gas generating cartridges, each of said cartridges including
      (i) a casing open at opposite ends thereof,
      (ii) a solid propellant grain mounted within said casing,
      (iii) an igniter within said casing to initiate burning of said grain,
      (iv) a cap sealingly mounted at each end of said casing forming, together with said casing, an enclosure for said grain, and
      (v) means to electrically connect said igniter with an electrical energy source,
   (b) a flexible belt having said cartridges mounted thereon in series, spaced-apart relationship,
   (c) rotatable transport means to move said cartridges sequentially into an ignition position, said transport means having a plurality of cartridge-receiving, longitudinally oriented, recesses equally spaced about the longitudinal peripheral surface of said transport means, the spacing of said recesses corresponding to the spacing of said cartridges on said belt,
   (d) drive means to rotate said transport means through a predetermined angular distance upon receipt of a demand signal,
   (e) first and second thrust direction control means releasably affixed on the end surfaces of said transport means to selectively permit
      (i) combined rotation of said thrust direction control means with said transport means, or
      (ii) relative rotation between said thrust direction control means and said transport means,
   said first and second thrust direction control means each comprising,
      (i) a plurality of exhaust nozzles extending longitudinally therethrough and being equally spaced thereabout in a pattern to permit alignment of said nozzles with said recesses, the number of said nozzles being equal to the number of said recesses, and
      (ii) a plurality of backing plates shaped to abut firmly against said caps, one of said backing plates being located between each pair of adjacent nozzles,
   said first and second thrust direction control means being aligned out of phase with respect to each other such that the nozzles of said first thrust direction control means are longitudinally aligned with the backing plates of said second thrust direction control means, the nozzles of said first thrust direction control means and the backing plates of said second thrust direction control means being aligned with said recesses to provide thrust in a first direction,
   (f) clutch means operatively associated with said first and second thrust direction control means to effect relative rotational motion between said transport means and said first and second thrust direction control means upon receipt by said clutch means of a signal indicating reversal in thrust direction is desired, said relative rotational motion causing the backing plates of said second thrust direction control means and the nozzles of said first thrust direction control means to longitudinally align with said recesses effecting a reversal in thrust direction, and
   (g) means to energize the igniter of one of said cartridges when said one of said cartridges is in said ignition position to initiate burning of said grain to produce gaseous combustion products, said products effecting rupture of one of said caps on the end of said one of said cartridges adjacent to the nozzle which is aligned with said one of said cartridges, said products then exhausting through the nozzle.

7. A bidirectional pulse rocket motor system as defined in claim 6 wherein said clutch means, upon receipt of a signal indicating a reversal in thrust direction is desired, permits rotation of said first and second thrust direction control means with said transport means for a portion of said predetermined angular distance and prevents rotation of said first and second thrust direction control means through the remaining angular distance through which said transport means rotates.

8. A bidirectional pulse rocket motor system as defined in claim 6 wherein the source of said demand signal is located remote from said pulse rocket motor system.

References Cited
UNITED STATES PATENTS

| | | | |
|---|---|---|---|
| 2,403,730 | 7/1946 | MacNeille | 60—26.11 X |
| 3,210,930 | 10/1965 | Leeper et al. | 60—250 X |
| 3,210,931 | 10/1965 | Elzufon et al. | 60—250 X |
| 3,263,419 | 8/1966 | Schmitz | 60—250 |
| 3,270,668 | 9/1966 | Silver | 60—256 X |
| 3,279,188 | 10/1966 | Price | 60—250 |

CARLTON R. CROYLE, *Primary Examiner.*